(12) United States Patent  
Palmer

(10) Patent No.: US 9,138,101 B2  
(45) Date of Patent: Sep. 22, 2015

(54) COOKING PAN APPARATUS AND SYSTEM WITH INTEGRAL COOKING LIQUID DRAIN, AND METHOD OF USE

(76) Inventor: Douglas Palmer, Albany, NY (US)

(*) Notice: Subject to any disclaimer, the term of this patent is extended or adjusted under 35 U.S.C. 154(b) by 1310 days.

(21) Appl. No.: 12/503,487

(22) Filed: Jul. 15, 2009

(65) Prior Publication Data

US 2009/0277338 A1    Nov. 12, 2009

Related U.S. Application Data

(60) Provisional application No. 61/207,580, filed on Feb. 17, 2009.

(51) Int. Cl.
*A47J 37/10* (2006.01)
*A47J 27/00* (2006.01)
*A47J 36/14* (2006.01)
*A47J 37/07* (2006.01)

(52) U.S. Cl.
CPC *A47J 37/10* (2013.01); *A47J 36/14* (2013.01); *A47J 37/0704* (2013.01)

(58) Field of Classification Search
CPC ... A47J 37/10; A47J 37/0786; A47J 37/0704; A47J 37/0611; A47J 37/0694; A47J 36/02; A47J 43/24; B65F 1/1615; B65B 3/003
USPC ........... 99/425, 400, 446, 422, 375, 426, 495; 220/573.1, 315; 141/11
See application file for complete search history.

(56) References Cited

U.S. PATENT DOCUMENTS

| | | | |
|---|---|---|---|
| 216,346 A | 6/1879 | Read | |
| 1,233,909 A | 7/1917 | Richardson | |
| 1,447,813 A * | 3/1923 | Patrick | 99/425 |
| 1,639,093 A | 8/1927 | Kircher | |
| 1,733,450 A | 10/1929 | Detwiler | |
| 1,763,174 A | 6/1930 | Morris | |
| 2,431,808 A * | 12/1947 | Kluit | 220/755 |
| 2,610,740 A | 9/1952 | Hunter | |
| 2,614,482 A * | 10/1952 | Lonskey, Jr. | 99/355 |
| 2,822,747 A | 2/1958 | Schwaneke | |
| 3,068,779 A | 12/1962 | Eidlisz | |
| 3,574,071 A * | 4/1971 | Covino | 205/118 |
| 3,847,068 A | 11/1974 | Beer et al. | |
| 3,948,481 A * | 4/1976 | Pollock | 251/351 |
| 4,052,934 A | 10/1977 | Shinman | |
| 4,352,324 A * | 10/1982 | Noh | 99/425 |
| 4,598,634 A * | 7/1986 | Van Horn, II | 99/340 |
| 4,832,226 A * | 5/1989 | Leon | 220/264 |
| 5,178,761 A | 1/1993 | Mohun | |
| 5,189,946 A * | 3/1993 | Leon | 99/403 |
| 5,285,824 A * | 2/1994 | Krstovic | 141/1 |
| 5,388,732 A * | 2/1995 | Greger | 222/572 |
| 5,584,236 A | 12/1996 | Margolis | |

(Continued)

OTHER PUBLICATIONS http://www.yankodesign.com/2014/12/29/easy-draining-pot/ (dated Dec. 29, 2014).

*Primary Examiner* — Dana Ross
*Assistant Examiner* — Hemant Mathew
(74) *Attorney, Agent, or Firm* — Jay R. Yablon

(57) ABSTRACT

A cooking pan apparatus, system, and method of use, comprising: a drain opening in a side wall of the pan; and a pan handle attached to the side wall, comprising a hollow drain channel enclosing the drain opening and running from proximate the drain opening to a drain exit proximate a distal end of the pan handle.

26 Claims, 6 Drawing Sheets

(56) References Cited

U.S. PATENT DOCUMENTS

| | | | |
|---|---|---|---|
| 5,653,881 A * | 8/1997 | Bruss et al. | 210/467 |
| 5,701,807 A * | 12/1997 | Park | 99/422 |
| 5,967,024 A * | 10/1999 | DeMars | 99/425 |
| 6,439,110 B1 | 8/2002 | Lin | |
| 6,591,741 B1 * | 7/2003 | Martin | 99/408 |
| 6,827,224 B2 | 12/2004 | Marriott et al. | |
| 7,322,495 B2 | 1/2008 | MacClarence | |
| 2008/0169293 A1 * | 7/2008 | Kurtz et al. | 220/571 |

* cited by examiner

COOKING PAN APPARATUS AND SYSTEM WITH INTEGRAL COOKING LIQUID DRAIN, AND METHOD OF USE

CROSS-REFERENCE TO RELATED APPLICATIONS

This application claims benefit of pending U.S. provisional application 61/207,580 filed Feb. 17, 2009, which is hereby incorporated by reference.

BACKGROUND OF THE INVENTION

When cooking foods in a pan, skittle, etc., it is well known in the art that the foods being cooked are often accompanied by cooking liquids which need to be drained from these foods during the cooking process and/or before these foods are served for consumption. These cooking liquids to be drained may originate from ingredients such as various cooking oils, butter, margarine, etc., added to the food during the cooking process, and/or they may originate directly from the process of cooking the foods to be consumed, for example, grease emerging from bacon, water from vegetables, etc.

In all cases, it becomes necessary to readily drain these cooking liquid from the pan without also spilling from the pan, the foods being cooked. In some instances, drainage during cooking is desirable. In other instances, drainage after cooking, or as an intermediate step in cooking (e.g., separation of a sauce or gravy), is desirable. Sometime, the liquids being drained are discarded, while other times, they are retained as a sauce or gravy or coating or topping for the eventual meal.

While it is common practice, for example, to hold a portion of a pan cover against the pan while the pan is tilted so as to allow cooking liquid to be drained while retaining the contents, as shown in FIG. 1, this is cumbersome and susceptible to error whereby either the cooking liquid does not get properly drained, and/or the food being cooked spills or fall from the pan along with the cooking liquid being drained.

The prior art contains some efforts to address this situation, but none of these are fully satisfactory. U.S. Pat. Nos. 1,733,450, 2,163,46, 3,847,068, 5,388,732 and 5,967,024 all disclose various spouts integral with the cooking pan, yet all of these entail draining over the top rim of the pan, and the problems one confronts in retaining the food being cooked when tilting the pan to pour off fluids are not resolved. Similarly, fluids in the collecting pot 20 of U.S. Pat. No. 1,447,813, which is "secured to the side 13 wall by rivets 19," see page 1, line 66, are also not easily drained without first removing the food being cooked from the pan.

It would be desirable to fabricate within the a pan, skillet, etc., a means for easily draining cooking liquids from the food being cooked, which does not have the various disadvantages of the prior art devices and methods.

Throughout this disclosure and in the associated claims, we shall use the term "pan" or "cooking pan" to encompass any and all pans, skillets, frypans, saucepans, etc., of any and all shapes and sizes, used for the frying, searing, and/or browning of foods.

SUMMARY OF THE INVENTION

Disclosed herein is a cooking pan apparatus, system, and method of use, comprising: a drain opening in a side wall of the pan; and a pan handle attached to the side wall, comprising a hollow drain channel enclosing the drain opening and running from proximate the drain opening to a drain exit proximate a distal end of the pan handle.

That is, a liquid drain placed in the side of a cooking pan, with or without a shut off valve, enables cooking liquid to exit the side of the pan through the pan handle without spilling the contents being cooked. The drain is placed within the inside end of the pan handle, such that the cooking liquid drains through the pan handle and exits through outside end of the pan handle.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) summarized below.

DETAILED DESCRIPTION

Figure 1:
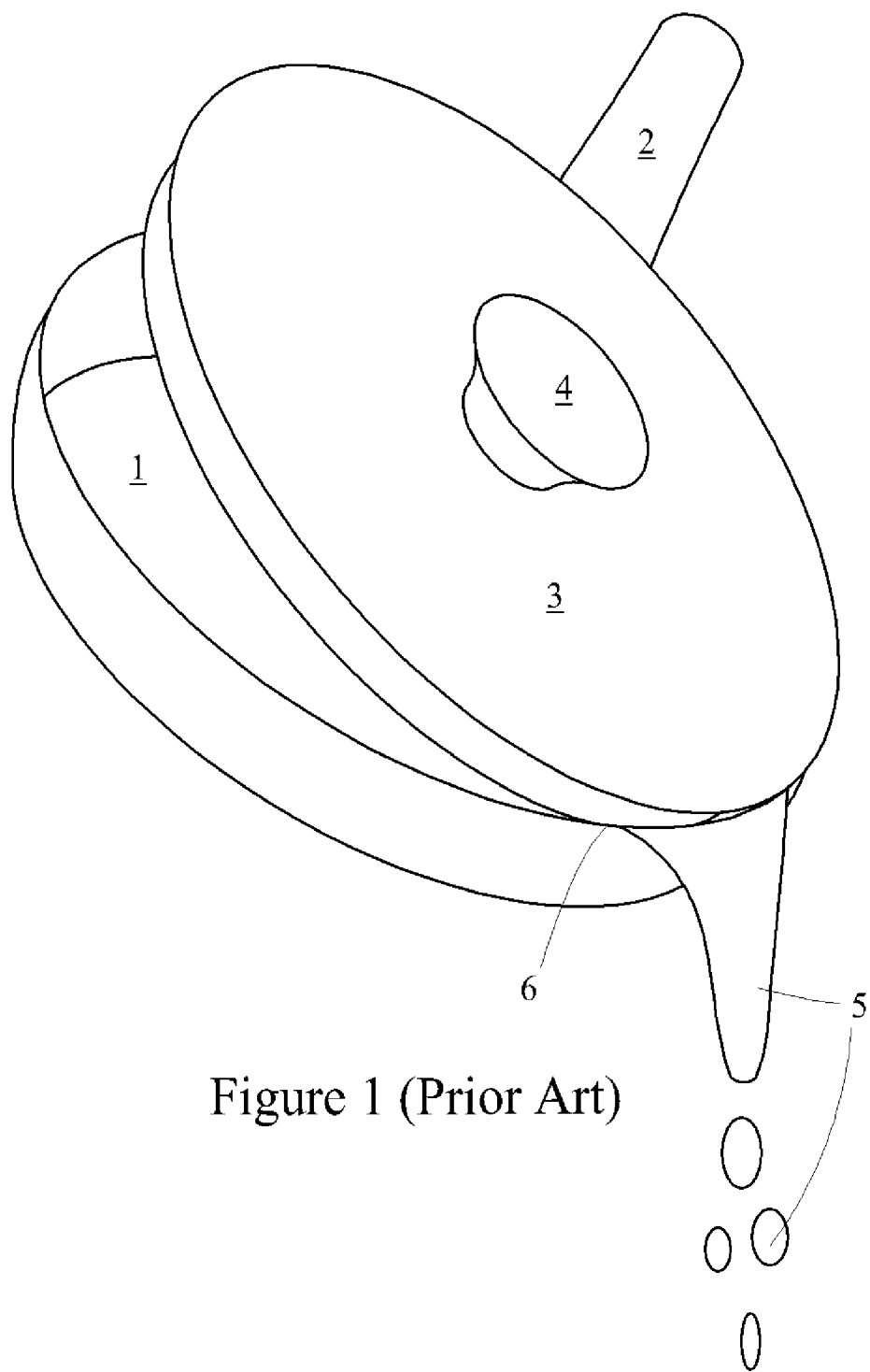
FIG. 1 is a perspective view illustrating a commonly-used prior art approach in which cooking liquids are drained by holding a portion of a pan cover against the pan while the pan is tilted so as to allow cooking liquids to be drained.

FIG. 1 illustrates a commonly-used prior art approach whereby cooking liquids are drained by holding a portion of a pan cover 3 against a pan 1 while the pan 1 is tilted so as to allow cooking liquids/fluids 5 to be drained over the top rim 6 of pan 1. In the prior art, when it is desired to drain cooking liquids 5 from a cooking pan 1, the user often grabs the pan 1 by its handle 2 with one hand and holds a pan cover 3 with the other hand (usually via a cover grip or knob 4), resting a circumferential portion of cover 3 proximate a circumferential portion of pan 1. The user then tilts both pan 1 and cover 3 in such a way that the fluid 4 can drain over the rim while the circumferential portion of cover 3 situated proximate the circumferential portion of pan 1 retains the foods being cooked (not shown here, but 21 in FIGS. 2 and 3) within the pan 1 and prevents these foods from spilling or falling from the pan 1. This is all illustrated in FIG. 1 and will be familiar to anyone who has ever used a pan to cook foods. As noted in the discussion in the background of the invention, this is cumbersome and susceptible to error whereby either the cooking liquid does not get properly drained, and/or the contents being cooked spill or fall from the pan along with the cooking liquid being drained.

Figure 2:
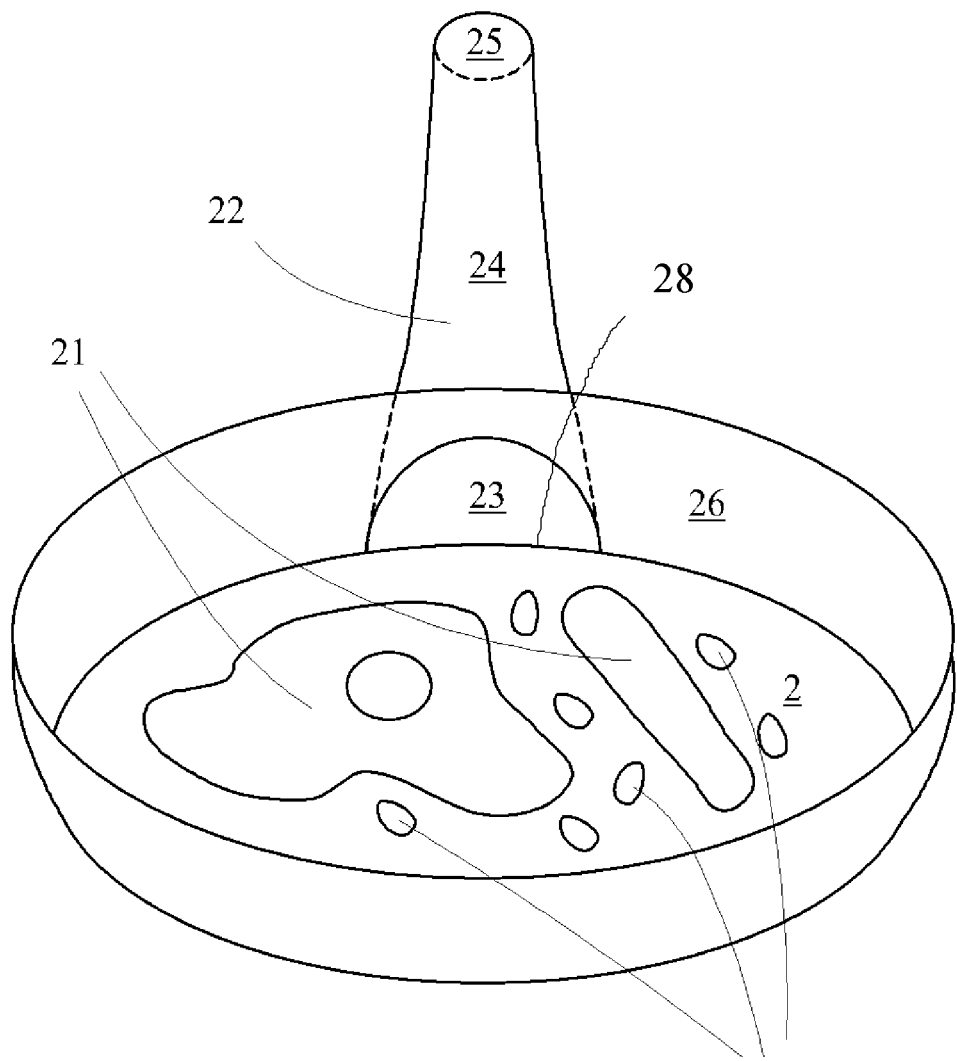
FIG. 2 is a perspective view illustrating an improved cooking pan in a preferred embodiment of the invention.

FIG. 2 illustrates an improved cooking pan 2 in a preferred embodiment of the invention. Food 21 is cooked in the usual way. (Here, the food is illustrated by an egg and a bacon strip, though this is merely illustrative and in no way limiting.) As a result of liquids/ fluids released from the food during cooking, and/or because of ingredients such as oil, butter, sauces, etc., added during cooking, cooking liquids 5 will accumulate within the pan 2, and at a certain point in the cooking process, it will be desirable to drain off these cooking liquids 5 before serving the food 21. Rather than employing the method illustrated in FIG. 1, this draining instead is achieved using a drain opening 23 fabricated directly into the side wall 26 of pan 2 so as to drain directly through a draining pan handle 22. at a juncture 28 at which a bottom of drain opening 23 meets and is aligned with a bottom cooking surface of pan 2. This utilizes the natural length extension of the handle not only for holding the pan, but for a natural drainage channel or conduit which can be controlled in a variety of was to be further elaborated herein. Drain opening 23 is integrally connected and enclosed within an at least partially-hollow drain channel 24 running through most or all of the length of draining pan handle 22, with drain channel 24 terminating in a drain exit 25 preferably proximate the end of the pan handle 22 most distal (least proximate) from the pan body of the pan 2.

Figure 3:
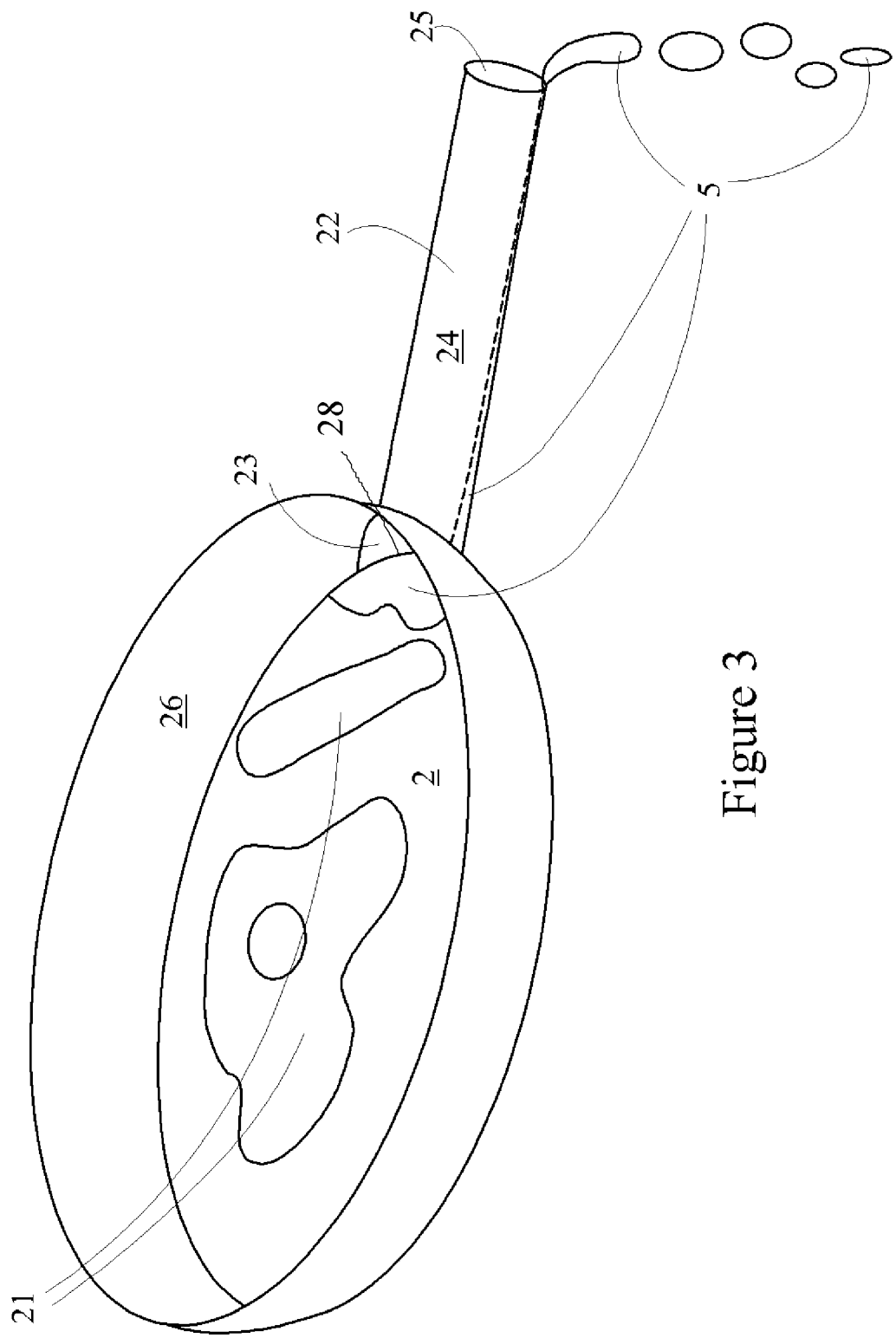
FIG. 3 is a perspective view illustrating a preferred method of using the improved cooking pan of FIG. 2 to drain cooking liquids from the pan.

FIG. 3 illustrates a preferred method for using the improved cooking pan 2 of FIG. 2. When it is desired to drain cooking liquids 5 from the pan while retaining the food 21, the user simply grabs the pan handle 22, and tilts the pan at a slight angle (perhaps from about 5 or 10, to 30 degrees) as shown. By gravitational action, the cooking liquids 5 will then tend to pool or accumulate in the most-descended portion of the pan. They will then naturally flow over juncture 28 through drain opening 23, through hollow drain channel 24, and out the drain exit 25, all as shown. Whereas the method of FIG. 1 requires using the pan cover 3 to retain the food 21 while draining because the cooking liquids 5 are drained over the top rim 6 as shown, the method illustrated in FIG. 3 does not require using the cover 3 because the drain opening 23 runs through the side wall 26 and into the drain channel 24 of pan handle 22, and so the side wall 26 itself will retain the food 21 during draining, without the need to use cover 3.

Figures 4, 5:
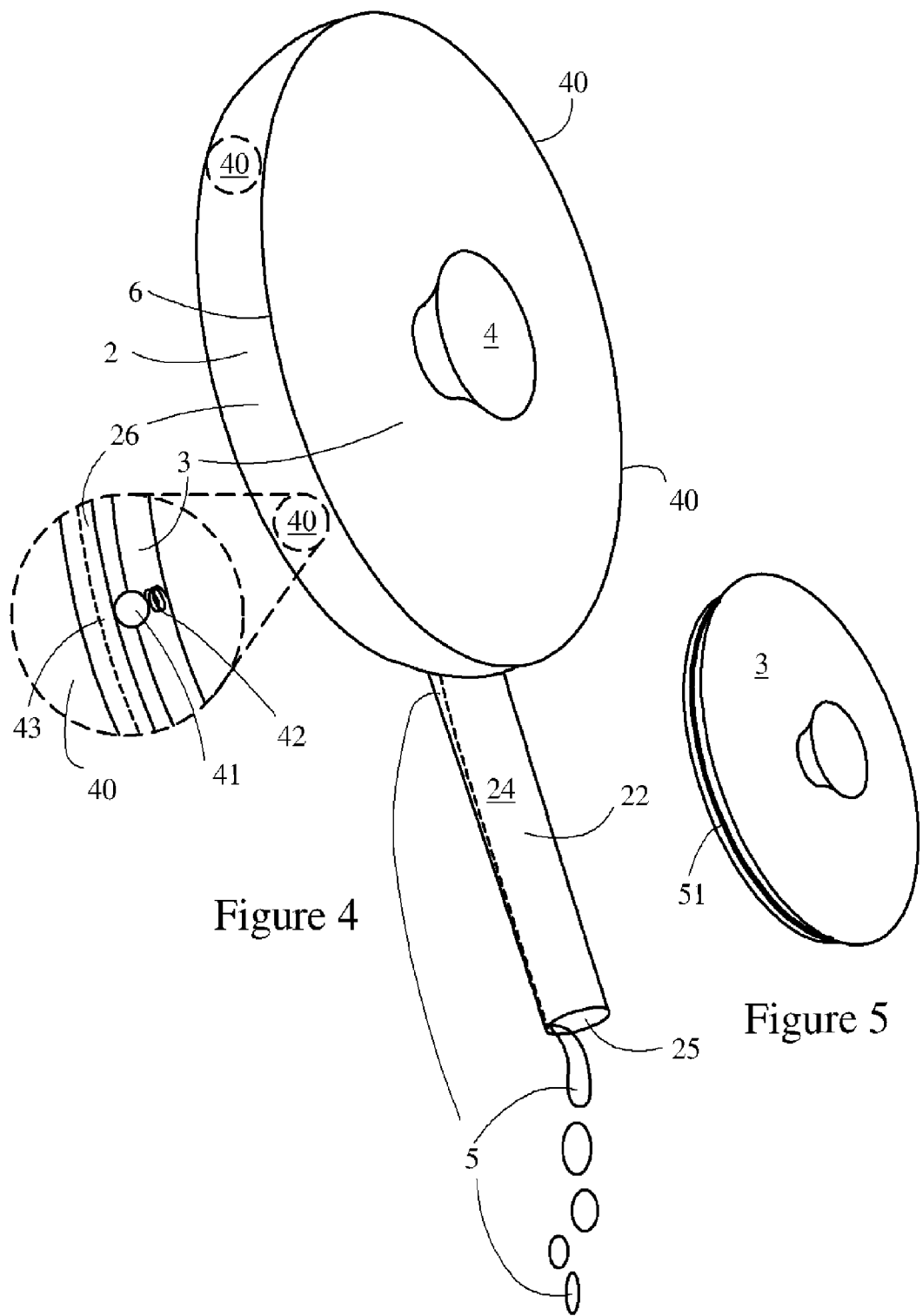
FIG. 4 is a perspective view illustrating an alternate preferred method of using the improved cooking pan of FIG. 2 to drain cooking liquids from the pan, at a steep angle, utilizing a pan cover fashioned to mate and hold together with the pan, without the need to manually hold the pan and pan cover together.
FIG. 5 is a perspective view illustrating a pan cover with a flexible circumferential rib for mating between the pan and its pan cover.

Of course, as illustrated in FIG. 4, the cover 3 may optionally be employed anyway, especially if a steeper angle of more than about 30 degrees is utilized. In this event, the cover 3 is placed firmly over the pan making contact substantially about the entire circumference of the pan and the cover, which is possible because the drain is in the side wall 26 and so it is not necessary to leave a space for cooking liquids to drain over the top rim 6 as in FIG. 1 and much of the prior aft. It will be apparent that this is a much more secure way of draining cooking liquids 5 even at a steep angle, because the cover 3 in this instance will retain the foods within the pan 2 no matter how steep the drain angle.

Also illustrated in the exploded portion of FIG. 4 is an optional cover-to-pan connector system 40 for holding pan 2 together with pan cover 3 with sufficient pressure and/or resistance, such that these do not have to be held together by hand when the pan 2 and cover 3 are tilted to drain cooking liquids from the pan. Prior to draining, these are connected together, at will, by hand, and following draining, may be disconnected at will, by hand. Many means for implementing cover-to-pan connector system 40 will be apparent to someone of ordinary skill, and any and all such means are considered to be within the scope of this disclosure and its associated claims. The illustrated embodiment—which is for illustration and is not limiting—features a ball détente 41 and suitable spring 42 mounted within the circumferential edge of cover 3, and a mating groove or similar receptacle 43 disposed circumferentially about the side wall 26 so as to suitably mate with ball détente 41 and hold together pan 2 and cover 3 without manual effort during draining. Obviously, this can be reversed, with the ball détente 41 and spring 42 being part of the pan 2 and the mating groove 43 being part of cover 3. That is, one is situated circumferentially about the pan 2 and the other situated circumferentially about said pan cover 3.

The cover-to-pan connector system 40 is illustrated in FIG. 4 to have four points of contact over the circumferences of pan 2 and cover 3, though it will be appreciated that this connection of pan 2 with cover 3 may be effectively achieved with as few as three points of contact in a "triangular" configuration, and with more than four points of contact up to and including continuous contact if, as illustrated in FIG. 5, for example not limitation, one were to use some form of flexible circumferential rib 51 mating with a circumferential mating groove 43, rather than the discretely-disposed ball détentes 41. Once again, the circumferential rib 51 and the circumferential mating groove 43 may be reversed, with either one situated circumferentially about said pan and the other one situated circumferentially about said pan cover. An added advantage of the FIG. 5 embodiment, is that the circumferential rib 51 and/or circumferential mating groove 43 may be fabricated from a plastic or rubber or similar material which serves the dual function of not only holding the pan 2 and the cover 3 together, but of substantially providing a fluidic seal between the pan 2 and the cover 3 when these are mated together.

Figure 6:
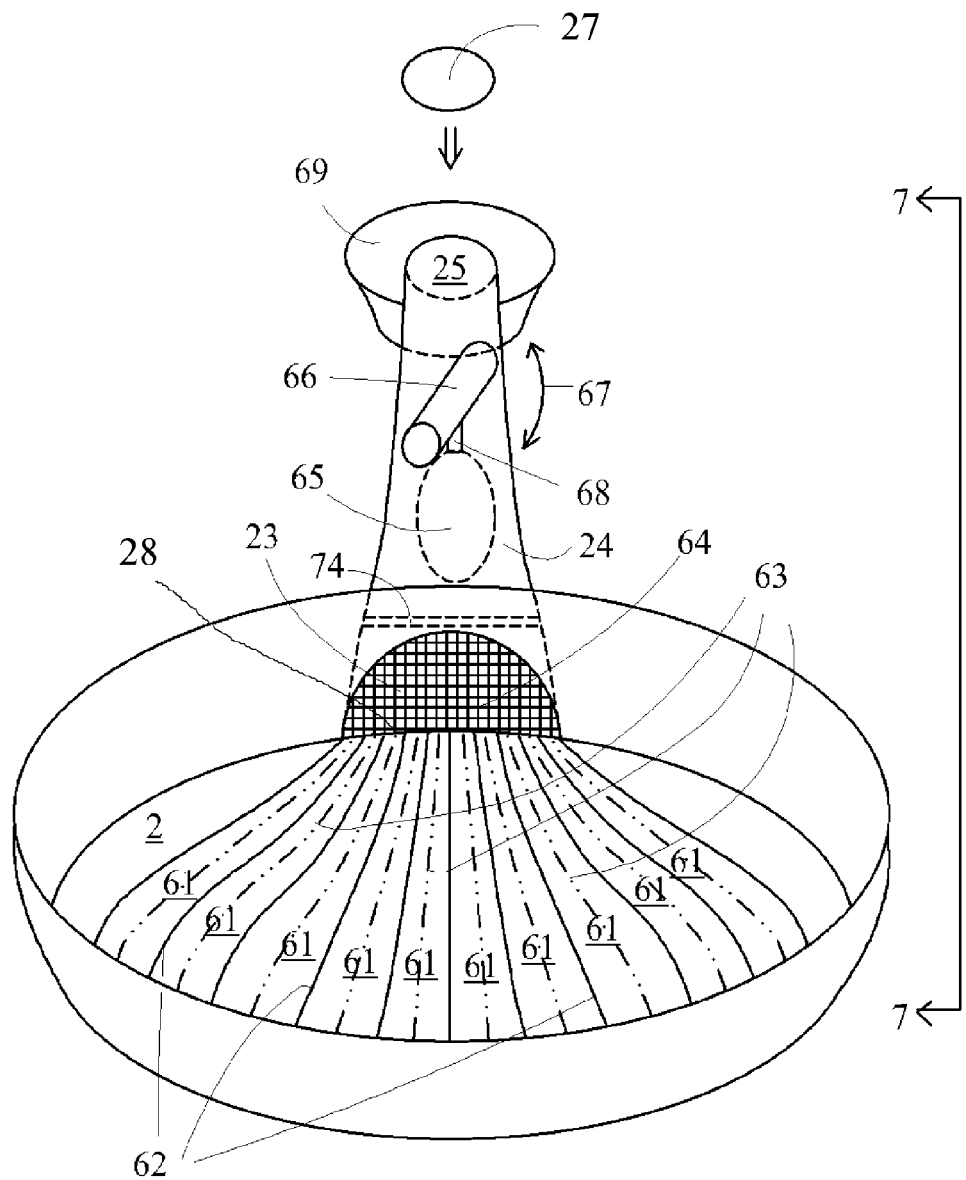
FIG. 6 is a perspective view illustrating several optional alternative embodiments of the invention, including drainage channels for channeling cooking liquids towards drain the opening, an optional cooking liquid collector, an optional drain opening screen, an optional drain control valve, an optional pan handle pivot and lock, and an optional drain exit cap.
Figure 7:
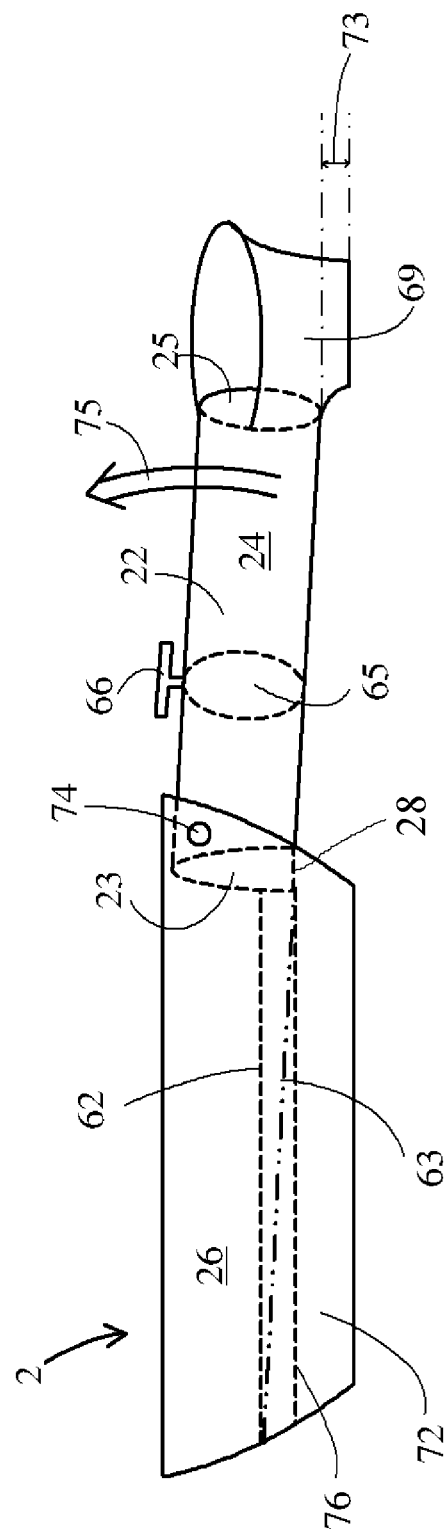
FIG. 7 is a side plan view of FIG. 6.

FIGS. 6 and its side plan view FIG. 7 illustrate several optional alternative embodiments of the invention, which may be employed separately, or in various combinations with one another. First, the bottom surface of pan 2 is illustrated to comprise a plurality of drainage channels 61 for channeling cooking liquids 5 towards drain opening 23. These drainage channels 61 comprise both elevated channel portions 62, as well as descending channel portions 63. As illustrated in the side cross-sectional view along 7-7 of FIG. 7, the elevated channel portions 62 are substantially horizontal, while the descending channel portions 63 are graded with a gradual descent moving toward drain opening 23. Thus, even when the pan 2 is sitting level atop a stove or burner and is cooking, the cooking liquids 5 will naturally gravitate uni-directionally toward juncture 28 and through drain opening 23. Optionally, for reasons which will shortly be discussed, these drainage channels 61 may be insertable into and removable from the pan bottom, which is schematically illustrated by the broken line 76 in FIG. 7.

In a further preferred though optional embodiment shown in FIG. 7, when the pan 3 is horizontal, pan handle 22 is configured to be slightly descending moving outwardly from drain opening 23, so that cooking liquids 5 will naturally flow through hollow drain channel 24 and out the drain exit 25.

Further, an optional cooking liquid collector 69 is situated at the distal end of pan handle 22, as shown in both FIGS. 6 and 7, so that liquids flowing out through drain opening 25 can be collected without draining out onto the cooking surface (e.g., stove or burner, not shown). This optional cooking liquid collector 69 may be permanently affixed to pan handle 22, or it may be connectable thereto and removable therefrom using a variety of connection/disconnection means which would be apparent to someone of ordinary skill in the art and so need not be elaborated here. As may be seen in FIG. 7, the required thickness of the pan bottom 72 will be dependent upon the exact graded descent angles of the descending channel portions 63 and the hollow drain channel 24, as well as the depth 73, if any, of bottom of liquid collector 69 beneath the bottom of the distal end of pan handle 22.

Second, FIG. 6 illustrates drain opening 25 filtered by an optional screen 64 (not shown in FIG. 7) affixed thereover. This filter/screen may be removable or permanent, using a variety of means that will be apparent to someone of ordinary skill. This screen 64 provides a physical barrier preventing the foods being cooked 21 from passing through drain opening 23 into drain channel 24 when the pan 2 is tilted as in FIG. 3, and especially as in FIG. 4 for which screen 64 then becomes a highly preferred option. If the screen is detachable, this facilitates cleaning of drain channel 24 after cooking is completed.

Third, FIGS. 6 and 7 illustrate an optional drain control valve 65 actuated by a drain valve actuator 66. Drain control valve 65 is used to control (permit or block or partially block) the flow of cooking liquids 5 through hollow drain channel 24, as desired by the user. The system illustrated here is a simple pivot valve in which the actuator 66 is pivoted 67 about valve neck 68 by the user in order to rotate drain control valve 65 so as to obstruct, or not obstruct, or partially obstruct, hollow drain channel 24.

In use, sometimes, it will be desirable to drain fluids during cooking, while other times, it may be desirable to only drain the fluids after cooking but to retain the fluids during the cooking to impart flavor and/or texture to the foods being cooked 21. Thus, in some instances, the user may wish to actuate drain control valve 65 into a closed (obstructing) configuration while cooking or during part of the cooking process, and to then open the valve at the point in time when draining is desired. Notwithstanding the particular illustration here, the opening and closing of drain control valve 65 can be implemented by a variety of valve systems known in the art, and all such valve systems are regarded to fall within the scope of this disclosure and its associated claims. For example, any sort of screw valve, such as those used for garden hose connectors, and any and all other suitable valve technologies known to those of ordinary skill, may be employed with equal facility, within the scope of this disclosure and its associated claims. Also, while the illustration in FIG. 7 shows drain control valve 65 in the mid-section of pan handle 22, this is illustrative only and this can be placed at any position along the length of pan handle 22, all within the scope of this disclosure and its associated claims. In fact, it will generally be preferred to situate drain control valve 65 fairly close to drain opening 23 (within the first 5% or 10% or 15% or 20% or 25% or 30% of the handle length as measured from drain opening 23) so that when it is desired to retain cooking liquids 5 during cooking, the closure of drain control valve 65 will cause the cooking liquids 5 to remain in the pan where they can saturate the foods being cooked 21, rather than in the pan handle 22 where they no longer affect the cooking process.

Fourth, FIGS. 6 and 7 schematically illustrate an optional pan handle pivot and lock 74, which allows pan handle 22 to pivot up or down as schematically illustrated by 75 to as to alter the angle of pan handle 22 relative to the body of pan 2, and to lock in place, whatever desired angle is set by the user. This can be accomplished by a variety of pivoting and locking means that will be apparent to someone of ordinary skill, and any suitable pivot and lock mechanism known within the art for achieving this is regarded to be within the scope of this disclosure and its associated claims. As just noted, in some instances it is desirable to drain cooking liquids 5 during cooking, while in other instances, it is desirable to retain cooking liquids 5 within the pan until later in the cooking process or even until cooking is complete. Thus, in place of, or supplementing, drain control valve 65, the upward pivoting 75 of the pan handle 22 into an ascended angular orientation will cause cooking liquids 5 to remain in the pan where they can be used to impart flavor and/or texture, while the downward pivoting into a descended angular orientation (which is the orientation illustrated in FIG. 7) will allow the cooking liquids to drain.

It is also noted that the inclusion or omission of drainage channels 61, as well as the exact angular configuration of drainage channels 61 if included, also affects drainage. Thus, a pan which omits these channels or lessens their angle will be preferred for cooking foods where it is desired to retain cooking liquids 5 during the cooking process, while a pan which includes drainage channels 61 especially at steeper angles will be particularly suited for cooking foods where it is desired to drain cooking liquids 5 during the cooking process. Thus, it is to be understood that the synergistic interaction among the various optional features illustrated in FIGS. 6 and 7 affects the manner in which the pan may be used for cooking, and that the engineering selection of particular optional features, separately and in combination, affects the manner in which the pan can be used to perform.

In this light, as noted earlier, drainage channels 61 may be provided by a separate drainage channel insert placed at the bottom 72 of the pan 2, so that this insert may be removed to provide a flat pan bottom in circumstances where drainage during cooking is not desired and it is instead desired to retain the cooking liquids 5 in contact with the food being cooked 21 throughout the cooking process. This removability is schematically illustrated by the broken line 76 in FIG. 7. Similarly, it is understood that the invention may be provided with one or more such inserts, with each insert being of varied character (different angles, channel shapes, etc.), enabling further user refinement and control of the liquid drainage/retention process.

Finally, FIG. 6 also illustrates an optional drain exit cap 27, which may be affixed over drain exit 25 as desired, much as a lens cap is placed over a camera lens, providing additional sealing when it is desired to close the drain exit 25.

The ability to drain cooking liquids 5 through the pan handle 24 as heretofore disclosed, not only provides a natural pan appearance in contrast to, for example, U.S. Pat. No. 1,447,813 while enabling drainage management with one hand, but it also provides all of the aforementioned options for fine tuning the cooking liquid drainage through the cooking process, to as to enhance the culinary arts capability of the user making use of this cooking pan system in its various embodiments.

Again, all of these options may be employed separately or in various combinations with one another, and the manner in which these features are employed separately and/or in combination can be used to fine tune the manner in which the pan will perform during the cooking process.

The knowledge possessed by someone of ordinary skill in the art at the time of this disclosure is understood to be part and parcel of this disclosure and is implicitly incorporated by reference herein, even if in the interest of economy express statements about the specific knowledge understood to be possessed by someone of ordinary skill are omitted from this disclosure. While reference may be made in this disclosure to the invention comprising a combination of a plurality of elements, it is also understood that this invention is regarded to comprise combinations which omit or exclude one or more of such elements, even if this omission or exclusion of an element or elements is not expressly stated herein, unless it is expressly stated herein that an element is essential to applicant's combination and cannot be omitted. It is further understood that the related prior art may include elements from which this invention may be distinguished by negative claim limitations, even without any express statement of such negative limitations herein. It is to be understood, between the positive statements of applicant's invention expressly stated herein, and the prior art and knowledge of the prior art by those of ordinary skill which is incorporated herein even if not expressly reproduced here for reasons of economy, that any and all such negative claim limitations supported by the prior art are also considered to be within the scope of this disclosure and its associated claims, even absent any express statement herein about any particular negative claim limitations.

Finally, while only certain preferred features of the invention have been illustrated and described, many modifications, changes and substitutions will occur to those skilled in the art. It is, therefore, to be understood that the appended claims are intended to cover all such modifications and changes as fall within the true spirit of the invention.

I claim:

1. A cooking pan system, comprising:
   a drain opening in a side wall of a pan of said system, said pan comprising a material suitable for cooking food thereon;
   a pan handle attached to said side wall at an attachment angle of said pan handle relative to said pan, comprising a hollow drain channel enclosing said drain opening and running from proximate said drain opening to a drain exit proximate a distal end of said pan handle; and
   a juncture at which a bottom of said drain opening meets and is aligned with a bottom cooking surface of said pan;
   wherein:
   while cooking food in said pan, a single downward tilt of said pan handle at a tilt angle determined by said attachment angle of said pan handle relative to said pan enables said cooking liquids to be removed and disposed of, by virtue of said attachment angle and said enclosure of the drain channel by said pan handle.

2. The cooking pan system of claim 1, further comprising:
   a pan cover;
   a cover-to-pan connector system for holding said pan together with said pan cover, wherein:
   said pan and said pan cover may be connected together, at will, by hand;
   when said pan and said pan cover connected thereto are tilted to drain cooking liquids from said pan through said drain channel, said pan and said pan cover do not need to be held together by hand; and
   said pan and said pan cover may be disconnected at will, by hand.

3. The cooking pan system of claim 2, said cover-to-pan connector system further substantially providing a fluidic seal between said pan and said pan cover while said pan and said pan cover are connected together.

4. The cooking pan system of claim 2, said cover-to-pan connector system comprising a flexible rib and a mating groove mating therewith, one situated circumferentially about said pan and the other situated circumferentially about said pan cover.

5. The cooking pan system of claim 2, said cover-to-pan connector system comprising a plurality of détentes, and at least one a mating receptacle mating therewith, one of said plurality of détentes and said at least one a mating receptacle situated circumferentially about said pan, and the other of said plurality of détentes and said at least one a mating receptacle situated circumferentially about said pan cover.

6. The cooking pan system of claim 1, further comprising a plurality of drainage channels for channeling cooking liquids towards said drain opening under force of gravity.

7. The cooking pan system of claim 6, further comprising at least one drainage channel insert comprising said drainage channels.

8. The cooking pan system of claim 1, further comprising a screen affixed over said drain opening for preventing foods being cooked from passing through said drain opening.

9. The cooking pan system of claim 1, said pan handle further comprising a user-actuated drain control valve for controlling a flow of cooking liquids through said hollow drain channel.

10. The cooking pan system of claim 1, further comprising a cooking liquid collector attached to said pan handle, for collecting cooking liquids exiting through said drain exit.

11. The cooking pan system of claim 1, further comprising a drain exit cap for sealing said drain exit, attachable to and removable therefrom at will.

12. The cooking pan system of claim 1, further comprising a pan handle pivot and lock for adjusting said attachment angle of said pan handle relative to said pan and for locking said angle in place.

13. The cooking pan system of claim 1, further comprising:
   a plurality of drainage channels for channeling cooking liquids towards said drain opening under force of gravity;
   a screen affixed over said drain opening for preventing foods being cooked from passing through said drain opening;
   a user-actuated drain control valve for controlling a flow of cooking liquids through said hollow drain channel;
   a cooking liquid collector attached to said pan handle, for collecting cooking liquids exiting through said drain exit; and
   a pan handle pivot and lock for adjusting said attachment angle of said pan handle relative to said pan and for locking said angle in place.

14. A method of draining cooking liquids from a cooking pan, comprising:
   cooking food in said pan;
   removing and disposing of said cooking liquids through a drain opening in a side wall of said pan, a bottom of said drain opening meeting and aligned with a bottom cooking surface of said pan at a juncture, and further through a pan handle attached to said side wall at an attachment angle of said pan handle relative to said pan, said pan handle comprising a hollow drain channel enclosing said drain opening and running from proximate said drain opening to a drain exit proximate a distal end of said pan handle, by a single downward tilting of said pan handle at a tilt angle determined by said attachment angle of said pan handle relative to said pan.

15. The method of claim 14, further comprising:
   connecting said pan together with a pan cover, at will, by hand, using a cover-to-pan connector system;
   draining cooking liquids from said pan through said drain channel by tilting said pan and said pan cover connected thereto, with said cover-to-pan connector system holding said pan together with said pan cover such that said pan and said pan cover do not need to be held together by hand; and
   disconnecting said pan and said pan cover, at will, by hand.

16. The method of claim 15, further comprising substantially fluidically sealing said pan and said pan cover while said pan and said pan cover are connected together, using said cover-to-pan connector system.

17. The method of claim 15, further comprising connecting said pan together with a pan cover using said cover-to-pan connector system comprising a flexible rib and a mating groove mating therewith, one situated circumferentially about said pan and the other situated circumferentially about said pan cover.

18. The method of claim 15, further comprising connecting said pan together with a pan cover using said cover-to-pan connector system comprising a plurality of détentes, and at least one a mating receptacle mating therewith, one of said plurality of détentes and said at least one a mating receptacle situated circumferentially about said pan, and the other of said plurality of détentes and said at least one a mating receptacle situated circumferentially about said pan cover.

19. The method of claim 14, further comprising channeling cooking liquids towards said drain opening under force of gravity, using a plurality of drainage channels for said channeling.

20. The method of claim 19, further comprising providing said drainage channels by inserting a drainage channel insert into said pan.

21. The method of claim 14, further comprising preventing foods being cooked from passing through said drain opening using a screen affixed over said drain opening.

22. The method of claim 14, further comprising controlling a flow of cooking liquids through said hollow drain channel, using a user-actuated drain control valve of said pan handle.

23. The method of claim 14, further comprising collecting cooking liquids exiting through said drain exit using a cooking liquid collector attached to said pan handle.

24. The method of claim 14, further comprising sealing said drain exit, using a drain exit cap for attachable to and removable therefrom at will.

25. The method of claim 14, further comprising adjusting said attachment angle of said pan handle relative to said pan and locking said angle in place, using a pan handle pivot and lock therefor.

26. The method of claim 14, further comprising:
channeling cooking liquids towards said drain opening under force of gravity, using a plurality of drainage channels therefor;
preventing foods being cooked from passing through said drain opening using a screen affixed over said drain opening;
controlling a flow of cooking liquids through said hollow drain channel, using a user-actuated drain control valve of said pan handle;
collecting cooking liquids exiting through said drain exit using a cooking liquid collector attached to said pan handle;
sealing said drain exit, using a drain exit cap for attachable to and removable therefrom at will; and
adjusting said attachment angle of said pan handle relative to said pan and locking said angle in place, using a pan handle pivot and lock therefor.

\* \* \* \* \*